United States Patent [19]

Amamiya

[11] 3,708,868
[45] Jan. 9, 1973

[54] METHOD OF MAKING NONSKID STUDS FOR TIRES AND SHOES

[75] Inventor: Ikuzou Amamiya, Yokohamashi, Japan

[73] Assignee: Kabushiki Kaisha Kanagawaseisakusho--Nishiterao, Kanagawaku, Yokohamashi, Kanagawa-ken, Japan

[22] Filed: April 27, 1971

[21] Appl. No.: 137,774

[30] Foreign Application Priority Data

Feb. 19, 1971  Japan..................................46/7561

[52] U.S. Cl.................................29/520, 152/210
[51] Int. Cl.............................B21d 39/00, B23p 11/00
[58] Field of Search..........29/511, 510, 520; 152/210

[56] References Cited

UNITED STATES PATENTS

| | | | |
|---|---|---|---|
| 2,211,537 | 8/1940 | Dickinson | 29/520 X |
| 2,419,469 | 4/1947 | Spiro | 29/520 UX |
| 3,125,147 | 3/1964 | Hakka | 152/210 |
| 3,345,736 | 10/1967 | Jakeway | 29/520 X |
| 3,404,718 | 10/1968 | Smith | 152/210 |
| 3,408,730 | 11/1968 | Anderson | 152/210 |

*Primary Examiner*—Charlie T. Moon
*Attorney*—Holman & Stern

[57] ABSTRACT

A method of making nonskid studs for tires and shoes characterized by making a vertical hole in an upper mold punch so that the lower hole part of said vertical hole may conform to a shank barrel, providing inclined ribs to project inward in the upper part of the lower hole part, making a circular hole in the upper part of the shank barrel of a columnar shank, inserting a superhard tip into said circular hole, fitting the shank in the lower mold and fixing the upper mold and lower mold to respective presses so that when the punch is lowered, the shank barrel may be compressed and fastened to be in the form of petals by the inclined ribs from above and, when the upper mold punch meets the base of the lower mold, the excess material of the shank barrel displaced by the inclined ribs may escape into respective clearances.

There has been already taken a method of making nonskid studs for tires of automobiles wherein a tip is inserted into a shank and is brazed or wherein a tapered tip is struck into a shank. However, there are defects that troubles and a large quantity of the material are required for the brazing and that troubles are required for the operations of copper or nichel-plating the tips and derusting and washing the shanks. Further, in tapering the tip, an error is likely to occur between the hole of the shank and the taper of the tip, the pressing is on one side and therefore there is a defect that the fastening can not be made well. When a punch having no rib is calked, there is a defect that the force pressing the tip and shank hole together is weak.

1 Claim, 4 Drawing Figures

3,708,868

METHOD OF MAKING NONSKID STUDS FOR TIRES AND SHOES

The present invention is a method of making nonskid studs for tires wherein such defects are eliminated.

The drawings illustrate an embodiment of the present invention.

Figure 1:
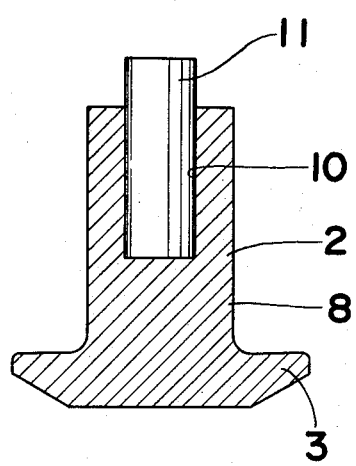
FIG. 1 is a vertically sectioned elevation of a shank and tip.
Figure 2:
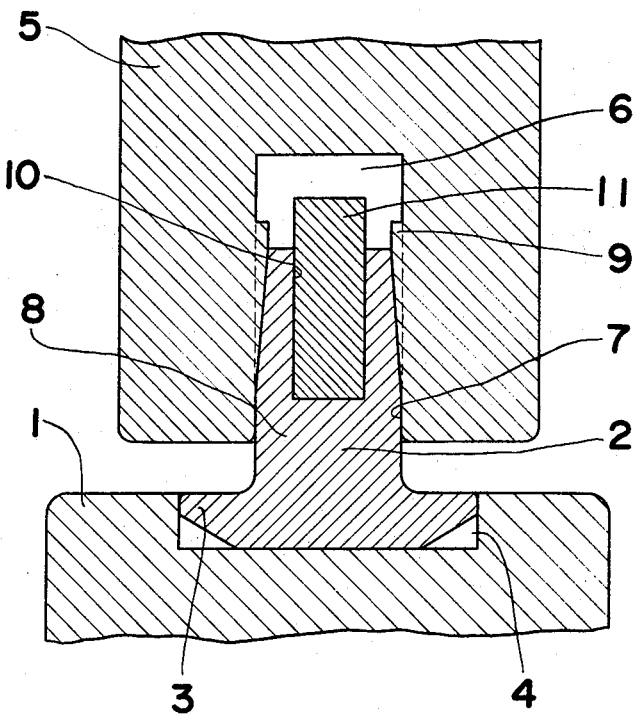
FIG. 2 is a vertically sectioned elevation of a punching apparatus.
Figure 4:
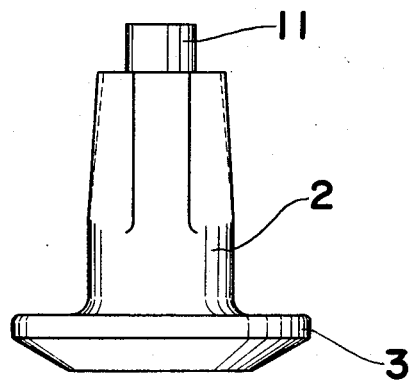
FIG. 4 is an elevation of a product.
Figure 3:
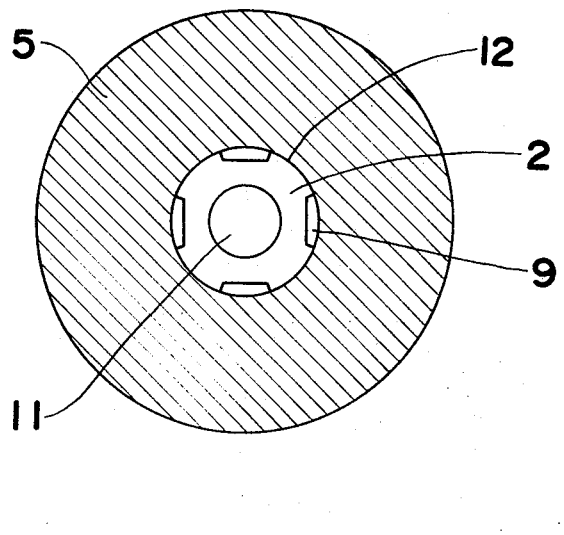
FIG. 3 is a cross-sectioned plan view of the same.

An embodiment of the present invention shall be explained with reference to the drawings. A concave hole 4 conforming to a flange 3 of a shank 2 is made in a lower mold 1, a vertical hole 6 is made in an upper mold punch 5 so that the lower part 7 of said vertical hole 6 may conform to a shank barrel 8 and, for example, four or six inclined ribs 9 are provided to project inward in the upper part of the lower hole part 7. The flange 3 is provided in the lower part of the columnar shank 2, a circular hole 10 is made in the upper part of the shank barrel 8, a superhard tip 11 is inserted into said circular hole 10, the thus made flange 3 of the shank 2 is fitted in the concave hole 4 of the lower mold 1, the upper mold 5 and lower mold 1 are fixed to respective presses so that, when the punch is lowered, the shank barrel 8 may be compressed and fastened to be in the form of petals by the inclined ribs 9 from above and, when the upper mold punch 5 meets the base of the lower mold 1, the excess material of the shank barrel 2 displaced by the inclined ribs 9 may escape into respective clearances 12 and, at the same time, the iron molecules of the part of the shank 2 within the upper mold punch 5 may become so high in the pressure as to tightly fasten the tip 11 and, at the same time, increase the hardness of the material.

By the way, in such case, the width, inclination and number of the inclined ribs 9 should be made proper so as to reduce the stress of the shank 2.

In short, according to the present invention, a vertical hole 6 is made in an upper mold punch 5 so that the lower hole part 7 of said vertical hole 6 may conform to a shank barrel 8, inclined ribs 9 are provided to project inward in the upper part of the lower hole part 7, a circular hole 10 is made in the upper part of the shank barrel 8 of the columnar shank, a superhard tip 11 is inserted into said circular hole 10, the shank is fitted in the lower mold and the upper mold 5 and lower mold 1 are fixed to respective presses so that, when the punch is lowered, the shank barrel may be compressed and fastened to be in the form of petals by the inclined ribs from above and, when the mold punch meets the base of the lower mold, the excess material of the shank barrel displaced by the inclined ribs may escape into respective clearances. Therefore, as the shank 2 is compressed to be in the form of petals with a slow inclination, the resistance or stress is very little, yet the fastening is tight, the material of the shank 2 is hardened and the clearances 12 of the shank 2 produced by the inclined ribs 9 prevent the rotation of the shank caused by its motion when it is struck into a tire or shoe sole. Thus a very durable and effective product is obtained.

What is claimed is:

1. A method of making nonskid studs for tires and shoes characterized by making a vertical hole in an upper mold punch so that the lower hole part of said vertical hole may conform to a shank barrel, providing inclined circumferentially spaced ribs to project inward in the upper part of the lower hole part, making a circular hole in the upper part of the shank barrel of a columnar shank, inserting a superhard tip into said circular hole, fitting the shank in the lower mold, fixing the upper mold and lower mold to respective upper and lower presses, and closing the presses to force the upper mold punch endwise over the shank barrel to compress and fasten the tip therein by forming longitudinal pedals on said barrel with said inclined ribs, the excess material of the shank barrel displaced by the inclined ribs may escape into respective clearances.

* * * * *